US006573904B1

(12) United States Patent
Chun et al.

(10) Patent No.: US 6,573,904 B1
(45) Date of Patent: Jun. 3, 2003

(54) METHOD AND APPARATUS IN A DATA PROCESSING SYSTEM FOR UPDATING COLOR BUFFER WINDOW IDENTIFIES WHEN AN OVERLAY WINDOW IDENTIFIER IS REMOVED

(75) Inventors: Sung Min Chun, Austin, TX (US); Richard Alan Hall, Round Rock, TX (US); George Francis Ramsay, III, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,303

(22) Filed: Jan. 6, 2000

(51) Int. Cl.[7] .................................................. G06F 3/00
(52) U.S. Cl. ...................................................... 345/629
(58) Field of Search ................................ 345/629, 759, 345/781, 783, 797, 803, 804, 806, 807, 182, 190, 193, 195

(56) References Cited

U.S. PATENT DOCUMENTS 5,831,638 A * 11/1998 West et al. ................. 345/501

OTHER PUBLICATIONS

Microsoft Press Computer Dictionary, 1997, Microsoft Press, Third Edition, p. 477.*

* cited by examiner

*Primary Examiner*—Kee M. Tung
*Assistant Examiner*—G. F. Cunningham
(74) *Attorney, Agent, or Firm*—Duke W. Yee; Mark E. McBurney

(57) ABSTRACT

A method and apparatus in a data processing system for updating a buffer containing display information used to display pixels from a first layer and a second layer on a display in the data processing system. Display information is identified for pixels in the first layer in a region corresponding to a removal of pixels being displayed in the second layer. This identification is performed using a data structure containing display information for displaying pixels in the first layer and pixels in the second layer to form identified display information. Display information in the buffer is updated using identified display information.

27 Claims, 8 Drawing Sheets

WID COLOR BUFFER

666611111111111<br>666611155555111<br>777771155555111<br>777771155555111<br>777771155555111<br>777771111111111

WID OVERLAY BUFFER

001111111222222<br>001111111000222<br>221111111000222<br>222222200000222<br>222222200000222<br>222222222222222

WID COLOR BUFFER

200

66 6611111 111111<br>66 6611155 555111<br>77 7771155 555111<br>777771155555111<br>777771155555111<br>777771111111111

WID OVERLAY BUFFER

202

00 0000000 222222<br>00 0000000 000222<br>22 0000000 000222<br>222222200000222<br>222222200000222<br>222222222222222

300

SCREEN 66 6611111 222222<br>66 6611155 555222<br>22 7771155 555222<br>222222255555222<br>222222255555222<br>222222222222222

700

COLOR WAT | OVERLAY WAT

| WID | PIXEL TYPE | COLORMAP | BUFFER | GAMMA | | PIXEL TYPE | COLORMAP | TRANSPARENT |
|---|---|---|---|---|---|---|---|---|
| 0 | | | | | | 8 | 0 | 2 |
| 1 | | | | | | 8 | 2 | 2 |
| 2 | | | | | | 8 | 3 | 2 |
| 3 | | | | | | 8 | 1 | 2 |
| 4 | | | | | | 8 | 2 | 2 |
| 5 | 8 | 0 | 0 | | | 8 | 4 | 1 |
| 6 | 8 | 4 | 0 | | | 8 | 4 | 1 |
| 7 | 24 | 3 | 0 | | | 8 | 4 | 1 |
| 8 | 24 | 2 | 0 | | | 8 | 4 | 1 |
| 9 | 8 | 1 | 0 | | | 8 | 4 | 1 |
| a | 8 | 4 | 0 | | | 8 | 4 | 1 |
| b | 8 | 4 | 0 | | | 8 | 4 | 1 |
| c | 8 | 3 | 0 | | | 8 | 4 | 1 |
| d | 8 | 2 | 0 | | | 8 | 4 | 1 |
| e | 24 | 1 | 0 | | | 8 | 4 | 1 |
| f | 8 | 0 | 0 | | | 8 | 4 | 1 |

FIG. 8
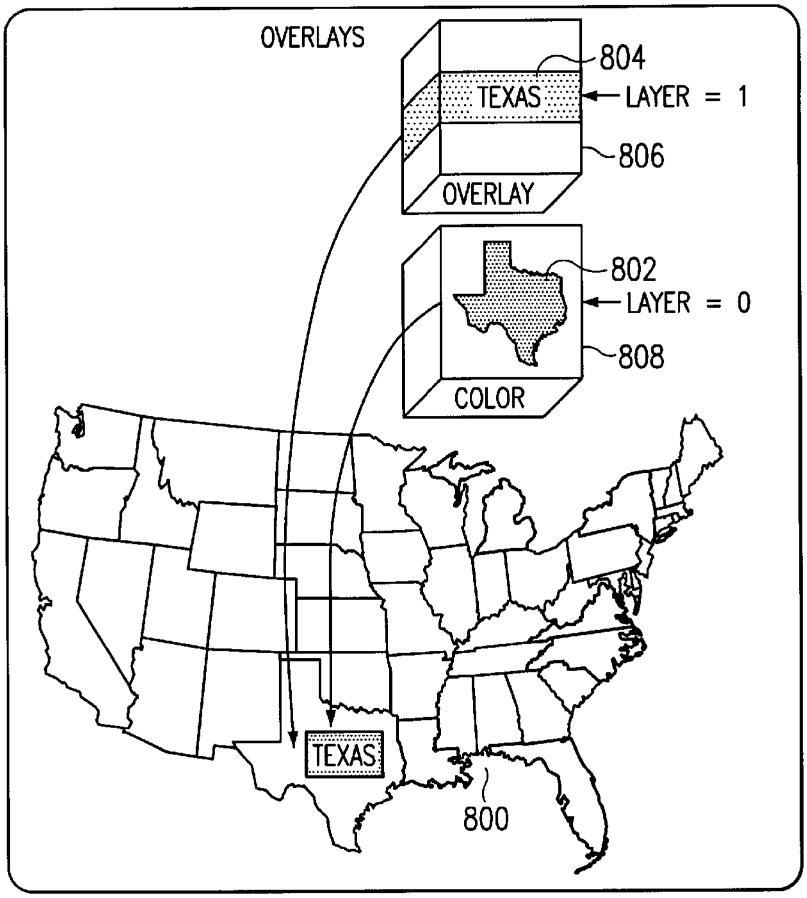
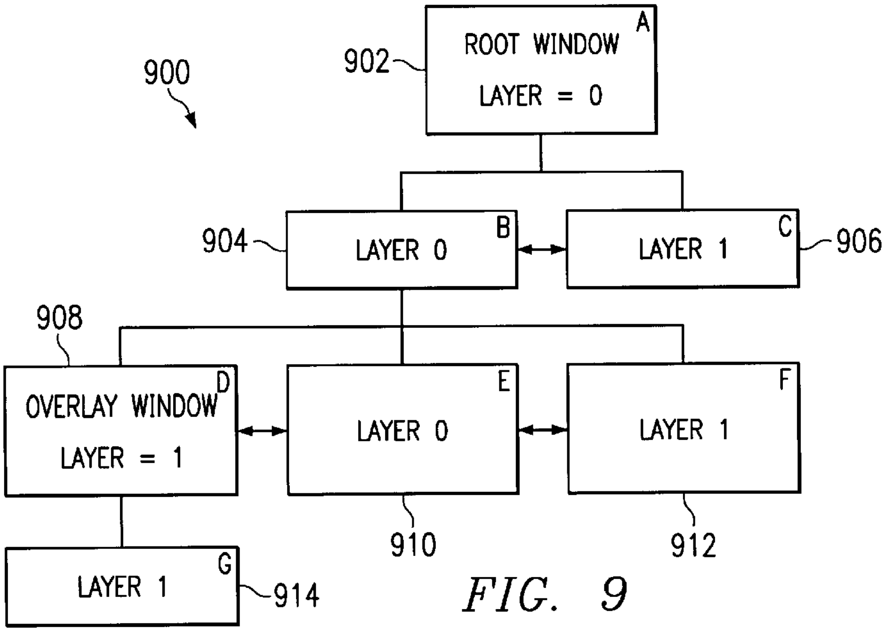
FIG. 9

1200

```
/*****************************************************************************
**
* NAME:      UpdateColorWIDS
*
*
*
* IN: region
*
*     pWin
*
*
*
* Description: This function will update all Color WIDS that intersect
*
* region. This function traverses pWin and all of its
*
* siblings and children
*
*****************************************************************************
**/

void UpdateColorWIDS(pScreen,region,pWin)
ScreenPtr pScreen;
RegionPtr region;
WindowPtr pWin;
{
  RegionRec              dRegion;
  aixddxWindowPrivPtr    pAixPrivWin;
  gWinGeomPtr            pWinGeom;
  winPrivPtr             pPrivWin;
  int                    flag;

  if(!pWin){
     return;
```

*FIG. 12A*

1200

```
}else{
   if(!pWin->layer && pWin->mapped) {
      (* pScreen->RegionInit) (&dRegion, (BoxPtr)NULL,0);

      if (pWin->borderWidth) {
         (* pScreen->Subtract)      (&dRegion, &pWin->borderClip,
                                    &pWin->winSize);
         (* pScreen->Union)         (&dRegion, &dRegion,
                                    &pWin->clipList);
         (* pScreen->Intersect      (&dRegion, region, &dRegion);
      }
      else {

         (* pScreen->Intersect) (&dRegion, region, &pWin->clipList);
      }
      if( (* pScreen->RegionNotEmpty ) (&dRegion) ) {
         pPrivWin = GET_WIN_PRIV(pWin);

         pAixPrivWin = (aixddxWindowPrivPtr)GET_aixWIN_PRIV(pWin);
         if (pAixPrivWin->i_am_dwa) {
            pWinGeom = pPrivWin->pGaiWinGeom;
            flag       = gCWwinOrg | gCWwidth | gCWheight |
                         gCWclip | gCWvisibility;
            aixLockAdapter(pScreen) (pScreen->myNum);
            (* pWinGeom->pProc->UpdateWinGeom) (pWinGeom, flag);
            aixUnlockAdapter(pScreen) (pScreen->myNum);

         }else{
            UpdateWIDPlanes( pScreen, pWin->layer,
                                  &dRegion, pPrivWin->pVWID->WID);
         }
      } /* if( (* pScreen->RegionNotEmpty ) (&dRegion) )*/

      (* pScreen->RegionDestroy) (&dRegion);

   }/* if(!pWin->layer) */

   pWin = pWin->firstChild;

  while(pWin) {
    UpdateColorWIDS(pScreen,region,pWin);
    pWin = pWin->nextSib;
  }
 } /* if(!pWin) */
}
```

*FIG. 12B*

METHOD AND APPARATUS IN A DATA PROCESSING SYSTEM FOR UPDATING COLOR BUFFER WINDOW IDENTIFIES WHEN AN OVERLAY WINDOW IDENTIFIER IS REMOVED

CROSS REFERENCE TO RELATED APPLICATIONS

The present invention is related to applications entitled METHOD AND APPARATUS FOR UPDATING A WINDOW IDENTIFICATION BUFFER IN A DATA PROCESSING SYSTEM; Ser. No. 09/478,304; and METHOD AND APPARATUS IN A DATA PROCESSING SYSTEM FOR INSTALLING APPROPRIATE WID VALUES FOR A TRANSPARENT REGION, Ser. No. 09/478,302; which are filed even date hereof, assigned to the same assignee, and incorporated herein by reference.

BACKGROUND OF THE INVENTION

1. Technical Field

The present invention relates generally to an improved data processing system and in particular to a method and apparatus for updating display information stored in a buffer in the data processing system. Still more particularly, the present invention provides a method and apparatus for updating color buffer window identifiers when an overlay window identifier is removed.

2. Description of Related Art

Computer graphics concerns the synthesis or display of real or imaginary objects from computer-based models. In computer graphics systems, images are displayed on a display device to a user in two dimensional and three dimensional forms. These images are displayed using pixels. A pixel is short for a picture element. One spot in a rectilinear grid of thousands of such spots that are individually "painted" to form an image produced on the screen by a computer or on paper by a printer. A pixel is the smallest element that display or print hardware and software can manipulate in creating letters, numbers, or graphics. These pixels and information relating to these pixels are stored in a buffer. The information describing a pixel is identified using a window ID (WID). A WID is used as an index into a window attribute table (WAT). The WAT contains information describing how a pixel will be displayed on the screen. For example, a WAT identifies depth, color map, buffer, and gamma for a pixel.

Typically, the WID is drawn into a separate buffer, which is used to describe how the pixels in the frame buffer or buffers will be rastered. Some graphic systems, such as, for example, UNIX servers, use overlays to enhance the performance of three dimensional applications, which need to be overlaid on top of a three dimensional application. An example of such is a menu. These type of servers typically require a separate WID buffer for the color planes and overlays to allow for the WIDs to be saved and restored. In FIG. 1A, an example of data in a portion of a WID color buffer is illustrated. FIG. 1B is an example of data in a portion of a WID overlay buffer. In these two examples, each of the numbers illustrates a WID, which is used as an index into a WAT to identify information used to display a pixel associated with the WID. The WIDs illustrated in FIGS. 1A and 1B are those prior to the removal of an overlay WID region. A "0" in the WID overlay buffer indicates that the overlay has been disabled.

In FIG. 2A, section 200 illustrates WIDs in a portion of a WID color buffer after an overlay WID region has been removed. The color WID buffer is unaffected. Similarly, section 202 in FIG. 2B illustrates WIDs in a WID overlay buffer after an overlay WID region has been removed from the WID buffer. This region is updated with the disabled overlay WID 0 so the color buffer can be seen on the screen.

Typically, an eight bit split WID may be identified in hardware in which three bits are used to identify the WID for the overlay buffer and in which five bits are used to identify the WID for the color buffer. For example, the first three bits are used as an index into an overlay WAT while the lower five bits are used as an index into a color WAT. With three bits, eight WID entries may be identified or assigned to a pixel using the WID overlay buffer. Thirty-two different WID entries may be assigned to pixels using the WID color buffer. In this manner, WIDs in the color buffer do not need to be updated since the color WID buffer was not overwritten by the overlay WID buffer. In FIG. 3, an example of WIDs that would be used to display pixels on a screen is shown using WIDs from a WID color buffer and a WID overlay buffer. Each of the WIDs identifies what pixels and from what buffer the pixels will be retrieved for display. Section 300 illustrates the restored region.

In manufacturing graphics chips, it is cheaper to fabricate a graphics chip without split WIDs. In such a case, only one WID buffer and two frame buffers are required. With this type of configuration, a means to restore the color buffer WIDs is absent.

Therefore, it would be advantageous to have an improved method and apparatus supporting updating of color buffer WIDs when an overlay WID is removed.

SUMMARY OF THE INVENTION

The present invention provides a method and apparatus in a data processing system for updating a buffer containing display information used to display pixels from a first layer and a second layer on a display in the data processing system. Display information is identified for pixels in the first layer in a region corresponding to a removal of pixels being displayed in the second layer. This identification is performed using a data structure containing display information for displaying pixels in the first layer and pixels in the second layer to form identified display information. Display information in the buffer is updated using identified display information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is an illustration of an overlay in accordance with a preferred embodiment of the present invention;

FIG. 9 is a diagram illustrating a window tree in accordance with a preferred embodiment of the present invention;

FIGS. 12A and 12B are diagrams illustrating an updated color WID function in accordance with a preferred embodiment of the present invention.

DETAILED DESCRIPTION OF THE PREFERRED EMBODIMENT

Figures 1A, 1B, 2A, 2B, 3, 4:
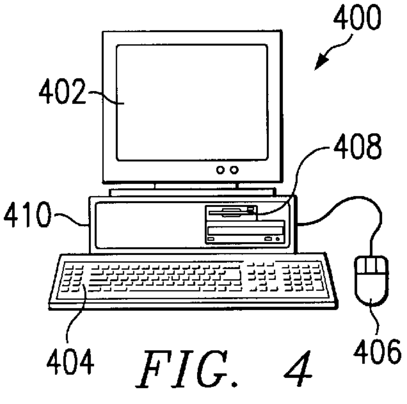
FIG. 1A is an example of data in a portion of a WID color buffer.
FIG. 1B is an example of data in a portion of a WID overlay buffer.
FIG. 2A is an example of data in a portion of a WID color buffer after an overlay WID region is removed.
FIG. 2B is an example of data in a portion of a WID overlay buffer after an overlay WID region is removed.
FIG. 3 is an example of WIDs used to display pixels on a screen using WIDs from a WID color buffer and a WID overlay buffer.
FIG. 4 is a pictorial representation of a data processing system in which the present invention may be implemented in accordance with a preferred embodiment of the present invention.

With reference now to the figures and in particular with reference to FIG. 4, a pictorial representation of a data processing system in which the present invention may be implemented is depicted in accordance with a preferred embodiment of the present invention. A computer 400 is depicted which includes a system unit 410, a video display terminal 402, a keyboard 404, storage devices 408, which may include floppy drives and other types of permanent and removable storage media, and mouse 406. Additional input devices may be included with personal computer 400. Computer 400 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 400 also preferably includes a graphical user interface that may be implemented by means of systems software residing in computer readable media in operation within computer 400.

Figure 5:
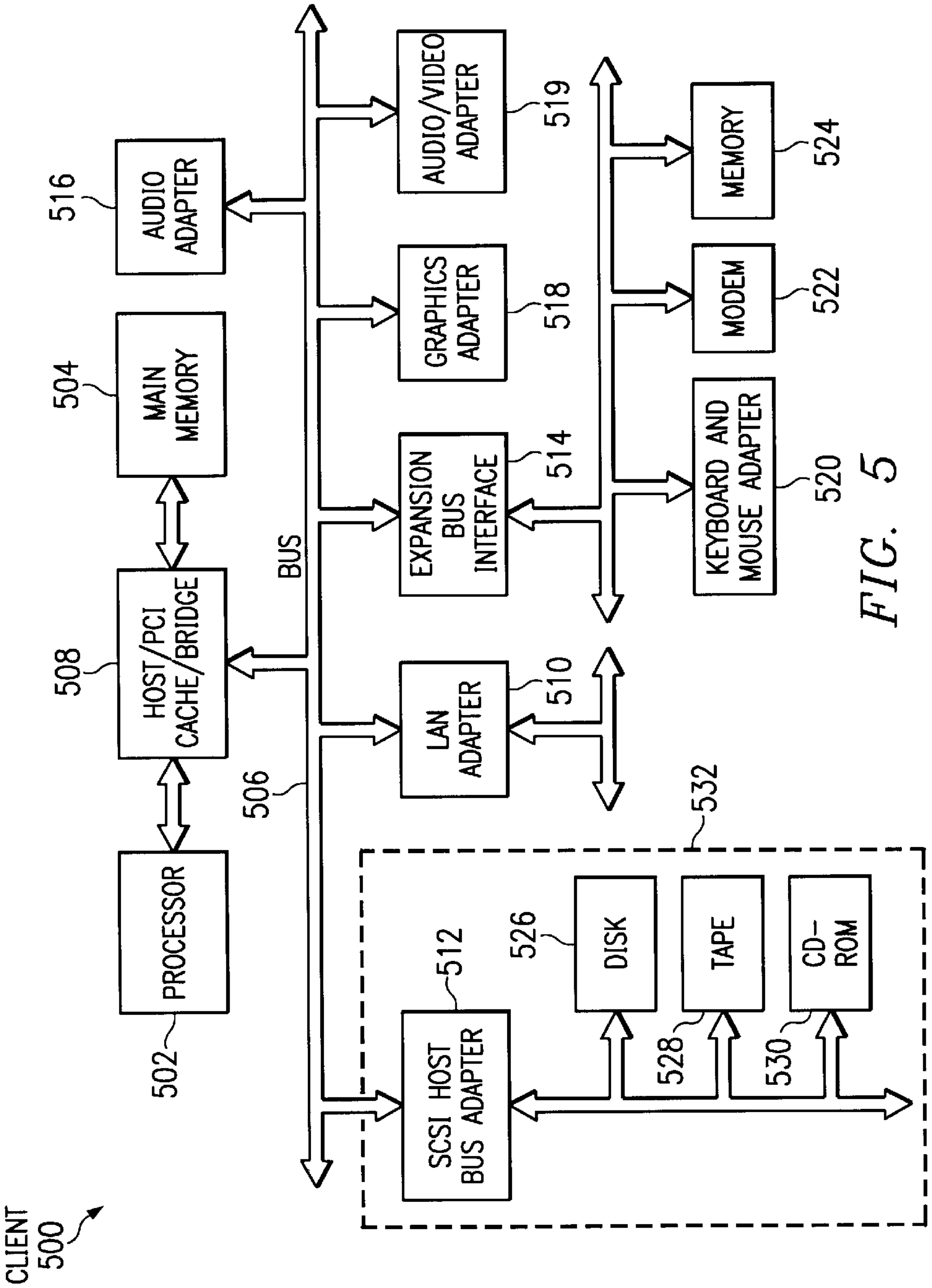
FIG. 5 is a block diagram illustrating a data processing system in which the present invention may be implemented.

With reference now to FIG. 5, a block diagram illustrating a data processing system in which the present invention may be implemented. Data processing system 500 is an example of a computer, such as computer 400 in FIG. 4, in which code or instructions implementing the processes of the present invention may be located. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, small computer system interface SCSI host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. The processes of the present invention may be used to manage rendering of data by graphics adapter 518 or audio/video adapter 519.

Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 500. "Java" is a trademark of Sun Microsystems, Inc. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

For example, data processing system 500, if optionally configured as a network computer, may not include SCSI host bus adapter 512, hard disk drive 526, tape drive 528, and CD-ROM 530, as noted by dotted line 532 in FIG. 5 denoting optional inclusion. In that case, the computer, to be properly called a client computer, must include some type of network communication interface, such as LAN adapter 510, modem 522, or the like. As another example, data processing system 500 may be a stand-alone system configured to be bootable without relying on some type of network communication interface, whether or not data processing system 500 comprises some type of network communication interface. As a further example, data processing system 500 may be a Personal Digital Assistant (PDA) device which is configured with ROM and/or flash ROM in order to provide non-volatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

Figures 6, 7:
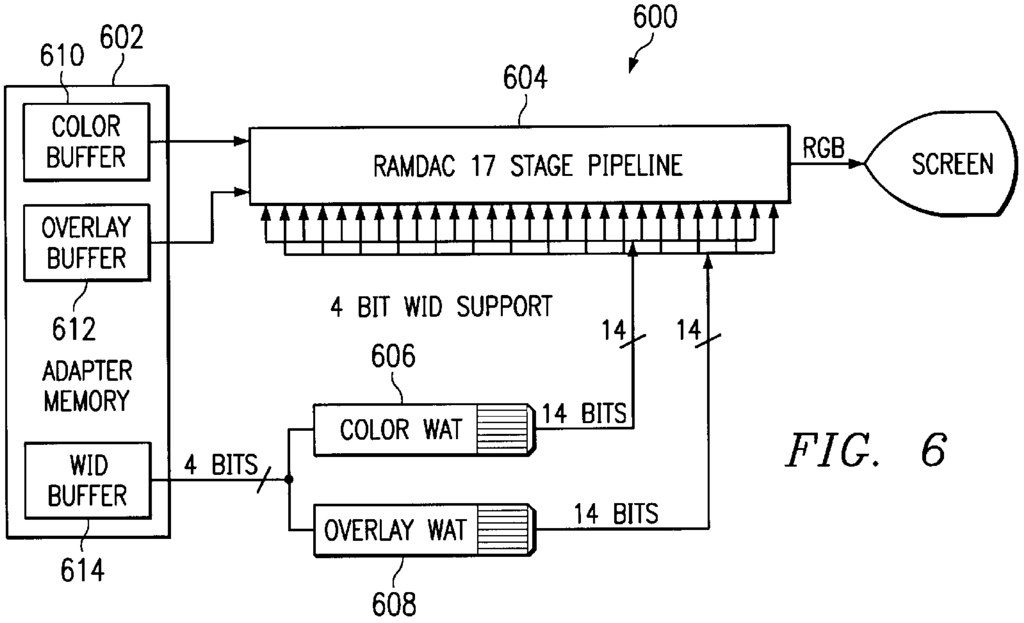
FIG. 6 is a block diagram illustrating a graphics adapter in accordance with a preferred embodiment of the present invention.
FIG. 7 is an example of a WAT table in accordance with a preferred embodiment of the present invention.

Turning next to FIG. 6, a block diagram illustrating a graphics adapter is depicted in accordance with a preferred embodiment of the present invention. Graphics adapter 600 is an example of a graphics adapter, such as graphics adapter 518 in FIG. 5. Graphics adapter 600 includes an adapter memory 602, a random access memory digital to analog converter (RAMDAC) 604, a color WAT table 606, and an overlay WAT table 608. Adapter memory 602 includes a color frame buffer 610, an overlay frame buffer 612, and a WID buffer 614. The two frame buffers contain pixels, which are sent to RAMDAC 604 for output to a display device. RAMDAC 604 is a graphics controller chip that maintains the color palette and converts data from memory into analog signals for a display device.

WID buffer 614 contains WIDs that are used as an index into color WAT table 606 and overlay WAT table 608. Each of these WAT tables describes how a pixel will be rendered on a display device.

In FIG. 7, an example of a WAT table is depicted in accordance with a preferred embodiment of the present invention. WAT table 700 contains information describing the pixel type, the color map, the buffer, and the gamma for color WATs. WAT Table 700 includes information such as pixel type, color map, and transparency for overlay WATs. WAT table 700, in this example, contains two sets of sixteen entries indexed by a WID. The pixel type in this example describes the pixel type as being an eight bit pseudo color or twenty-four bit true color. Other information that may be included may be, for example, which frame buffer will be displayed, whether the overlay is transparent, or whether the overlay is disabled. These entries may be used in color WAT table 606 and overlay WAT table 608 in FIG. 6.

In this example, only four bits are used as an index into a WAT table. Each table contains sixteen entries, which are indexed by a WID from WID buffer 614 in FIG. 6. This is in contrast to an eight bit system in which the WID is split between the color WAT and the overlay WAT. The four bit WID is shared between the overlay and color WAT. So each WID entry will point to an overlay WAT and color WAT. The buffer used to display the pixel on the screen will depend on a setting of the overlay WAT for the WID entry. This setting will be an opaque overlay, transparent overlay, or disabled overlay. If the setting is disable overlay, the buffer used to display the pixel will be the color frame buffer, with the pixel interpretation defined by the color WAT table indexed by the WID value. If the setting is opaque overlay, the buffer used to display the pixel will be the overlay frame buffer, with the pixel interpretation defined by the overlay WAT table indexed by the WID value. If the setting is transparent overlay, the buffer used to display the pixel is determined by the pixel value in the overlay frame buffer.

If the pixel value in the overlay frame buffer is not the defined transparent pixel value (e.g. 0xff), the buffer used to display the pixel will be the overlay frame buffer, with the pixel interpretaion defined by the overlay WAT table indexed by the WID value. If the pixel value in the overlay frame buffer is the defined transparent pixel value, the buffer used to display the pixel will be the color frame buffer, with the pixel interpretation defined by the color WAT table indexed by the WID value.

The present invention provides a method, apparatus, and computer implemented instructions for restoring WIDs for pixels in a color frame buffer when an overlay WID region is removed. The mechanism of the present invention updates WIDs for pixels in a color frame buffer in a specified region corresponding to the region that was removed for WIDs for pixels in the overlay frame buffer. All 2 dimensional and 3 dimensional WIDs are updated if they fall within the specified region. This process occurs using a root window as the parent window and traversing the window tree. If the window is a color window(layer 0), then the exposed WID region for the window is intersected with overlay region that was removed. If this exposed region is not empty, the region is redrawn in the WID buffer using the windows WID. This exposed region is the exposed WID region for the color window intersected with the overlay region that was removed.

With reference now to FIG. 8, an illustration of an overlay is depicted in accordance with a preferred embodiment of the present invention. In this example, map 800 may be displayed using pixels located in two frame buffers and a single WID buffer. Map 800 includes a set of pixels in a color frame buffer that represent states in map 800. For example, shape 802 is that of the State of Texas. The pixels for shape 802 are located in a color frame buffer, while the text "Texas" 804 is located in an overlay frame buffer. In this example, "Texas" 804 is located in a region 806 in the overlay frame buffer, while shape 802 is located in a region 808 in the color frame buffer. The region where the text is located is opaque, while other portions are transparent. As an example depicted in accordance with the present invention, the overlay region 806 is removed, then the display information for the color buffer will be updated to provide the correct pixel interpretation for the color buffer where the overlay region was removed.

With reference now to FIG. 9, a diagram illustrating a window tree is depicted in accordance with a preferred embodiment of the present invention. Window tree 900 is stored within a data structure in a main or host memory of a data processing system. In these examples, window tree 900 is maintained by an x server. Window tree 900 includes a root window 902. Window 904 and window 906 are children windows of root window 902. Window 904 and window 906 are called sibling windows in window tree 900. Windows 908, 910, and 912 are sibling windows to each other and are children windows to window 904. Window 914 is a child to window 908. In this example, window 902 represents a color or layer 0 window similar to that illustrated in region 808 in FIG. 8. Window 908, in this example, is an overlay or layer 1 window similar to region 806 in FIG. 8. The other windows may be either layer 0 or layer 1 windows as shown in FIG. 9. With these different windows in window tree 900, the present invention will identify the parent or root window, as well as processing the different overlay windows.

Figure 10:
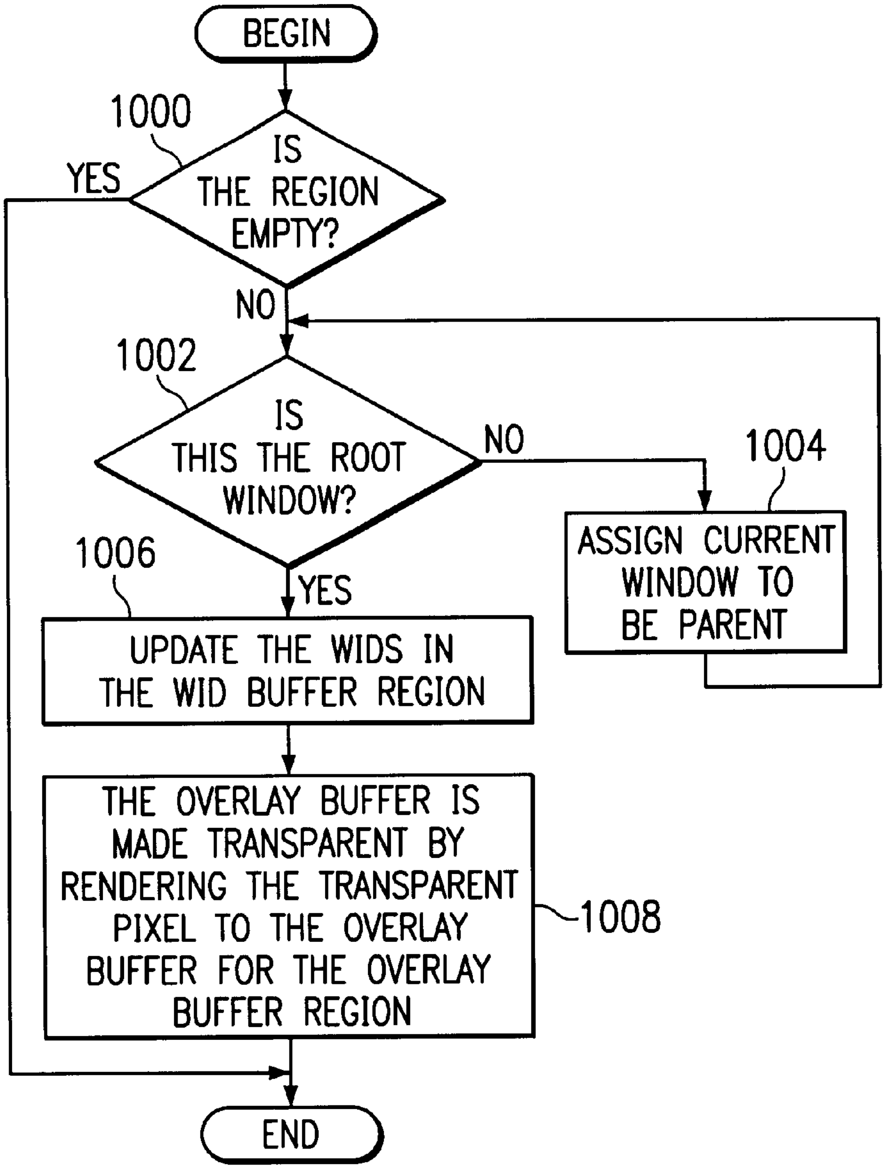
FIG. 10 is a high level process of a flowchart for updating WIDs for color pixels in accordance with a preferred embodiment of the present invention.

With reference now to FIG. 10, a high level process of a flowchart for updating WIDs for color pixels is depicted in accordance with a preferred embodiment of the present invention. This process is used when split WID support is absent for handling WIDs for color frame buffers and overlay frame buffers. In particular, the process is used to update color buffer WIDs when overlay WIDs are removed from the WID buffer.

The process begins by determining whether the region being processed is empty (step 1000). If the region is empty, the process terminates. Otherwise, a determination is made as to whether the window is a root window (step 1002). If the window is not the root window, the current window being processed is assigned to be the parent window (step 1004) with the process then returning to step 1002.

If the window being processed is the root window, the WIDs in the WID buffer region are updated (step 1006). Step 1006 is described in more detail in the description of FIG. 11 below. The overlay buffer region is made transparent by rendereing the transparent pixel value to this region (step 1008) with the process terminating thereafter. The transparent region is rendered by drawing a filled rectangle with the transparent pixel (e.g. 0xff) value in the overlay buffer. This region will be transparent if the overlay WAT is set to be transparent overlay. In a split WID system, the WID buffer is rendered with the overlay disabled WID. In FIG. 2B, the WID value 0 is the overlay disbled WID. Using shared WIDs, the region is rendered transparent so the color WID buffer is unafected and the correct pixel interpretations are rendered on the screen.

Figure 11:
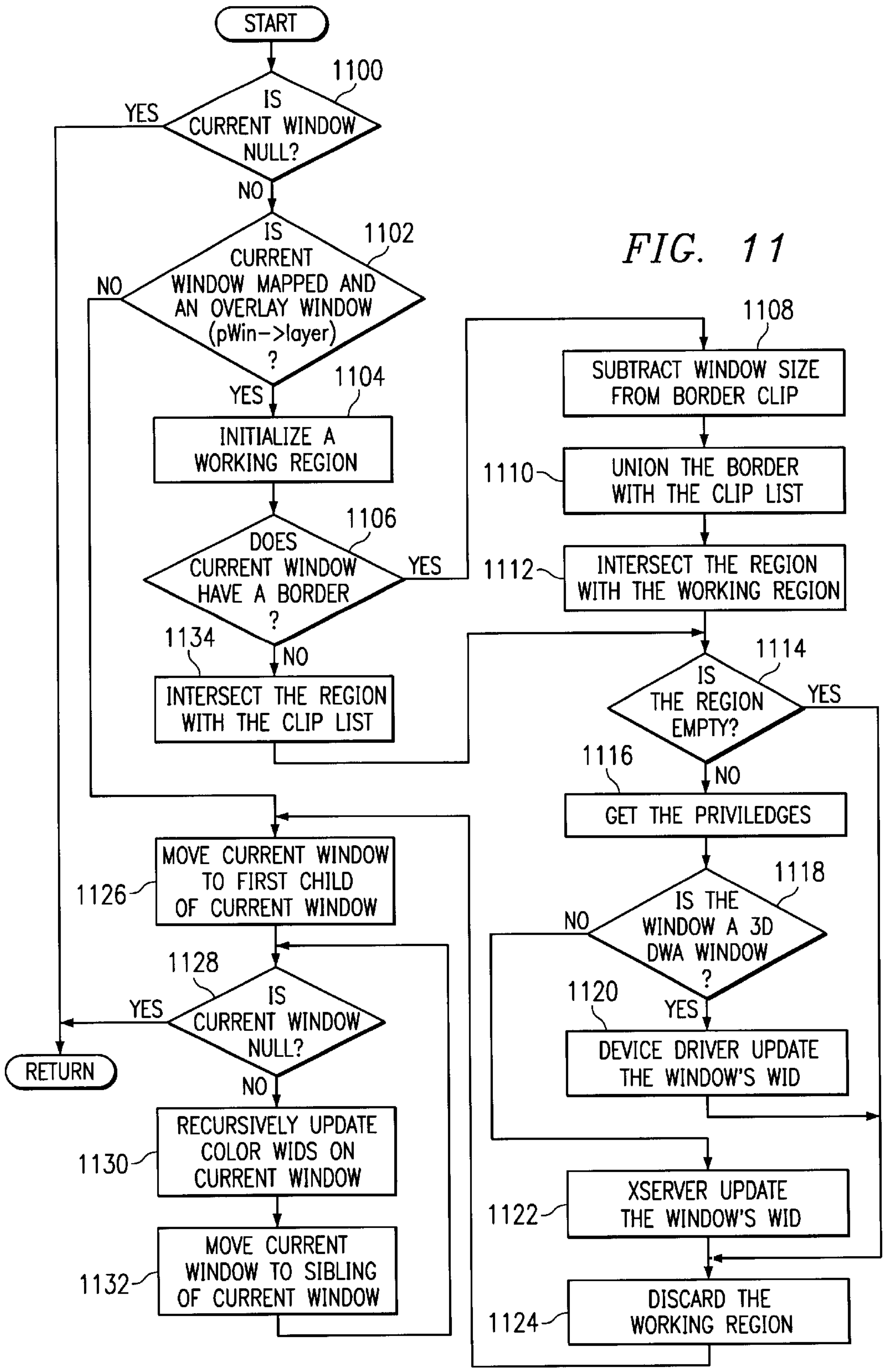
FIG. 11 is a flowchart of a process for updating color WIDs in accordance with a preferred embodiment of the present invention.

Turning next to FIG. 11, a flowchart of a process for updating color WIDs is depicted in accordance with a preferred embodiment of the present invention. The process illustrated in FIG. 11 is used to update color WIDs in a particular region. In these examples, the process will update the color WIDs for a removed overlay WID buffer region. This process is also called a UpdateColorWIDS function and is a more detailed description of step 1006 in FIG. 10.

The process begins by determining whether the current window is null (step 1100). This step determines whether the pointer is to the root window. If the current window is null, the process terminates. Otherwise, a determination is made as to whether the current window is mapped and whether the current window is an overlay window (step 1102). If a window is mapped, it may be viewable. Unmapped windows are never viewable. If the current window is mapped and is an overlay window, a working region is initialized (step 1104).

Next, A determination is made as to whether the current window has a border (step 1106). A bordered window is a window that contains a rectangular region larger than the window, so that the window is inside the border region. If the current window has a border, it is a bordered window. The window size is subtracted from the border clip (step 1108). The border clip contains the viewable portion of the border after all clipping has been completed. Since the border clip contains the border and everything within it, the window size has to be subtracted to obtain the border region. Next, the border is unioned with the clip list (step 1110). The working region is then intersected with the region (step 1112). The region intersected with the clip list in step 1112 is the region passed to the process in FIG. 11.

Next, a determination is made as to whether the region is empty (step 1114). Once the region is intersected with the working region, the region can be checked to see if it is an empty region. An empty region is defined when the number of rectangles that make up the region is equal to zero. If the region is not empty, the privileges are obtained (step 1116). This is a private structure created by the device dependent X (ddx) code and is obtained from the current window. This private stucture can be found from the devprivates field in the WindowRec structure. The present invention is described with reference to X, which is also referred to as X Windows or X Window System. X is a windowing system, which runs under UNIX and all major operating systems. X lets users run applications on other computers in the network and view the output on their own screen. X generates a rudimentary window that can be enhanced with GUIs, such as Open Look and Motif, but does not require applications to conform to a GUI standard. The window manager component of the GUI allows multiple resizable, relocatable X windows to be viewed on screen at the same time. X client software resides in the computer that performs the processing and X server software resides in the computer that displays it. Both components can also be in the same machine.

A determination is made as to whether the window is a 3 dimensional DWA window (step 1118). A 3 dimensional Direct Window Access (DWA) allows graphics standards, such as OpenGL and graPHIGS, to have access to the window directly. The 3 dimensional API does not have to go through X in order to render. DWA is supported by AIX, which is available from International Business Machines Corporation. The device driver updates the WIDS for DWA windows so a call must be made to the device driver to update the WID if necessary.

If the window is a 3 dimensional DWA window, the device driver updates the window's WID (step 1120). A call is made to the device driver to update the WID associated with the window. The Window Geometry, which includes, for example, the clip region, WID value, WID region, is passed to the device driver so the WID can be updated. The device driver performs this update by rendering the WID value to the WID buffer in the WID region.

Otherwise, the X server updates the window's WID (step 1122). X updates the WIDs for all non DWA windows. The WID is updated by rendering the WID region to the WID buffer. In either case, the working region is then discarded (step 1124).

Then, the current window is moved to the first child window of the current window (step 1126). This step is used to select the next window for processing. A determination is made as to whether the current window is null (step 1128). If the current window is null, the process terminates. Otherwise, color WIDs for the current window are recursively updated (step 1130). Step 1130 is a recursive step used to represent an entry into another process starting with step 1100. Thereafter, the current window is moved to a sibling of the current window (step 1132) with the process then returning to step 1128.

With reference again to step 1114, if the region is empty, the process proceeds to step 1124 as described above. Turning back to step 1106, if the current window does not have a border, the region is intersected with the clip list (step 1134). This region is the region originally passed to the process in FIG. 11. The process then proceeds to step 1114 as described above.

With reference again to step 1102, if the current window is not both a mapped window and an overlay window, the process proceeds to step 1126.

With reference now to FIGS. 12A and 12B, diagrams illustrating an updated color WID function are depicted in accordance with a preferred embodiment of the present invention. In this example, the code is in C. Code 1200 will update all color WIDs that intersect the region. In particular, code 1200 will traverse the parent window, as well as all of the siblings and children of the parent window to update the color WIDs that intersect the region. In code 1200, while windows in a window tree are being traversed, a window in the color plane is mapped to the screen, border and clip list regions are unioned together and then intersected with the specified region. If the region is not empty in these examples, and the window is a DWA window, then the device driver updates the WID. Otherwise, if the window is a non DWA window, the x server will update the WID.

Thus, the present invention provides a method, apparatus, and computer implemented instructions for updating WIDs for pixels in a color buffer in a region corresponding to a region that was previously covered by pixels in an overlay frame buffer. This mechanism provides the same functionality as split WIDs without requiring a split WID system. Thus, the present invention allows for the use of a less complex graphics chip and reduces hardware costs. This mechanism also allows for the provision of a maximum number of WIDs in the hardware. The processes may be implemented in software that is executed by processors located in a computer, such as a central processing unit.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMS, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for updating a buffer containing display information used to display pixels from a first layer and a second layer on a display in the data processing system, the method comprising the data processing system implemented steps of:

identifying display information for pixels in the first layer in a region corresponding to a removal of pixels being displayed in the second layer using a data structure containing display information for displaying pixels in the first layer and pixels in the second layer to form identified display information; and updating the display information in the buffer using identified display information.

2. The method of claim 1, wherein the display information is a set of window identifiers.

3. The method of claim 2, wherein the set of window identifiers serves as an index into a window attribute table used to display the pixels.

4. The method of claim 1, wherein the data structure is a window tree.

5. The method of claim 4, wherein the window tree includes window identifiers for a plurality of windows.

6. The method of claim 1, wherein the pixels in the first layer are color pixels and the pixels in the second layer are overlay pixels.

7. A method in a data processing system for updating a buffer containing display information used to display pixels from a first layer and a second layer on a display in the data processing system, the method comprising the data processing system implemented steps of:

identifying display information for pixels in the first layer in a region corresponding to a removal of pixels being displayed in the second layer using a data structure containing display information for displaying pixels in the first layer and pixels in the second layer to form identified display information; and updating the display information in the buffer using identified display information, wherein the data structure is a window tree containing the window tree includes window identifiers for a plurality of windows, wherein the pixels in the first layer are color pixels and the pixels in the second layer are overlay pixels and wherein the color pixels are stored in a first frame buffer and the overlay pixels are stored in a second frame buffer.

8. A method in a data processing system for updating a buffer containing window identifiers used to display pixels from a first layer and a second layer on a display in the data processing system, the method comprising the data processing system implemented steps of:

identifying a region in which pixels in the second layer are removed from display;

searching a data structure for window identifiers for pixels in the first layer that are to be displayed in response to identifying the region, wherein the data structure includes window identifiers for a set of windows displayed in the first layer and in the second layer; and updating window identifiers in the buffer corresponding to the region using display information.

9. The method of claim 8, wherein the window identifiers serve as an index into a window attribute table used to display the pixels in the first layer and the pixels in the second layer.

10. The method of claim 8, wherein the first layer is a color layer and the second layer is an overlay layer.

11. A display apparatus comprising:

a first frame buffer for storing a first set of pixels;

a second frame buffer for storing a second set of pixels;

a first window attribute table storing display information;

a second window attribute table storing display information;

a window identifier buffer connected to the first window attribute table and the second window attribute table, wherein the window identifier buffer stores window identifiers used to identify display information for the first set of pixels and for the second set of pixels;

random access memory digital to analog converter unit connected to the first frame buffer, the second frame buffer, the first window attribute table, and the second window attribute table and having a connection configured to connection to a display device, wherein the random access memory digital to analog converter unit receives pixels for display from the first frame buffer and the second frame buffer and displays the pixels using display information from the first window attribute table and the second window attribute table; and a processing unit, wherein the processing unit identifies display information for pixels in the first frame buffer in a region corresponding to a removal of pixels being displayed in the second frame buffer layer using a data structure containing display information for displaying pixels in the first frame buffer and pixels in the second frame buffer to form identified display information and updates display information in the window identifier buffer using identified display information.

12. The display apparatus of claim 11, wherein the display apparatus is a graphics adapter and wherein the processing unit is a processor located on the graphics adapter.

13. The display apparatus of claim 11, wherein the display apparatus is a computer and wherein the first frame buffer, the second frame buffer, the first window attribute table, the second window attribute table, and the window identifier buffer are located in a graphics adapter in the computer and the processing unit is a central processing unit in the computer.

14. A data processing system for updating a buffer containing display information used to display pixels from a first layer and a second layer on a display in the data processing system, the data processing system comprising:

identifying means for identifying display information for pixels in the first layer in a region corresponding to a removal of pixels being displayed in the second layer using a data structure containing display information for displaying pixels in the first layer and pixels in the second layer to form identified display information; and updating means for updating display information in the buffer using identified display information.

15. The data processing system of claim 14, wherein the display information is a set of window identifiers.

16. The data processing system of claim 15, wherein the set of window identifiers serve as an index into a window attribute table used to display the pixels.

17. The data processing system of claim 14, wherein the data structure is a window tree.

18. The data processing system of claim 17, wherein the window tree includes window identifiers for a plurality of windows.

19. The data processing system of claim 14, wherein the pixels in the first layer are color pixels and the pixels in the second layer are overlay pixels.

20. A data processing system for updating a buffer containing display information used to display pixels from a first layer and a second layer on a display in the data processing system, the data processing system comprising:

identifying means for identifying display information for pixels in the first layer in a region corresponding to a removal of pixels being displayed in the second layer using a data structure containing display information for displaying pixels in the first layer and pixels in the second layer to form identified display information; and updating means for updating display information in the buffer using identified display information, wherein the window tree includes window identifiers for a plurality of windows, wherein the pixels in the first layer are color pixels and the pixels in the second layer are overlay pixels wherein the data structure is a window tree and wherein the color pixels are stored in a first frame buffer and the overlay pixels are stored in a second frame buffer.

21. A data processing system for updating a buffer containing window identifiers used to display pixels from a first layer and a second layer on a display in the data processing system, the data processing system comprising:

identifying means for identifying a region in which pixels in the second layer are removed from display;

searching means for searching a data structure for window identifiers for pixels in the first layer that are to be displayed in response to identifying the region, wherein the data structure includes window identifiers for a set of windows displayed in the first layer and in the second layer; and updating means for updating window identifiers in the buffer corresponding to the region using display information.

22. The data processing system of claim 21, wherein the window identifiers serve as an index into a window attribute table used to display the pixels in the first layer and the pixels in the second layer.

23. The data processing system of claim 21, wherein the first layer is a color layer and the second layer is an overlay layer.

24. A computer program product in a computer readable medium for updating a buffer containing display information used to display pixels from a first layer and a second layer on a display in the computer program product, the computer program product comprising:

first instructions for identifying display information for pixels in the first layer in a region corresponding to a removal of pixels being displayed in the second layer using a data structure containing display information for displaying pixels in the first layer and pixels in the second layer to form identified display information; and second instructions for updating display information in the buffer using identified display information.

25. A computer program product in a computer readable medium for updating a buffer containing window identifiers used to display pixels from a first layer and a second layer on a display in the computer program product, the computer program product comprising:

first instructions for identifying a region in which pixels in the second layer are removed from display;

second instructions for searching a data structure for window identifiers for pixels in the first layer that are to be displayed in response to identifying the region, wherein the data structure includes window identifiers for a set of windows displayed in the first layer and in the second layer; and third instructions for updating window identifiers in the buffer corresponding to the region using display information.

26. A method in a data processing system for updating a buffer containing first display information used to display pixels from a first layer and a second layer on a display in the data processing system, the method comprising the data processing system implemented steps of:

identifying a region in which pixels in the second layer are removed;

searching a data structure for first layer display information for pixels in the first layer that are to be displayed in response to identifying the region, wherein the data structure includes second display information for a set of regions displayed in the first layer and in the second layer; and updating the first display information in the buffer corresponding to the region using the first layer display information found in the data structure.

27. A data processing system for updating a buffer containing first display information used to display pixels from a first layer and a second layer on a display in the data processing system, the data processing system comprising the data processing system implemented steps of:

identifying means for identifying a region in which pixels in the second layer are removed;

searching means for searching a data structure for first layer display information for pixels in the first layer that are to be displayed in response to identifying the region, wherein the data structure includes display information for a set of regions displayed in the first layer and in the second layer; and updating means for updating display information in the buffer corresponding to the region using the first layer display information.

* * * * *

UNITED STATES PATENT AND TRADEMARK OFFICE

CERTIFICATE OF CORRECTION

PATENT NO. : 6,573,904 B1
DATED : June 3, 2003
INVENTOR(S) : Chun et al.

It is certified that error appears in the above-identified patent and that said Letters Patent is hereby corrected as shown below:

<u>Column 10,</u>
Line 33, before "random", insert -- a --.

Signed and Sealed this

Fourteenth Day of October, 2003

JAMES E. ROGAN
*Director of the United States Patent and Trademark Office*